Figures 1, 2, 3:
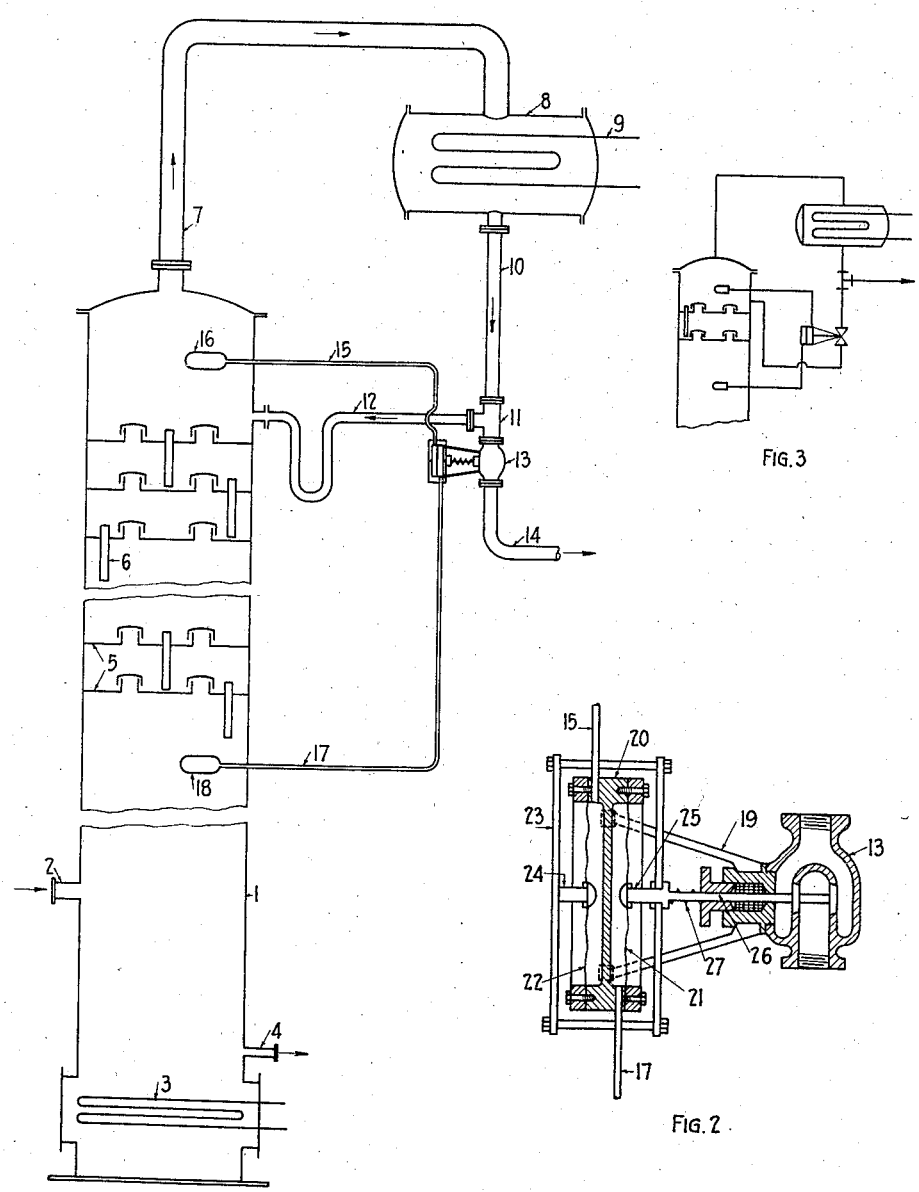

Dec. 3, 1935.   G. A. KRAMER   2,022,809
METHOD FOR FRACTIONATION CONTROL
Original Filed Aug. 18, 1931   2 Sheets-Sheet 1

Inventor: Gustav A. Kramer
By His Attorney:

Dec. 3, 1935.  G. A. KRAMER  2,022,809
METHOD FOR FRACTIONATION CONTROL
Original Filed Aug. 18, 1931  2 Sheets-Sheet 2

Inventor  Gustav. A. Kramer
By His Attorney

Patented Dec. 3, 1935

2,022,809

UNITED STATES PATENT OFFICE 2,022,809

METHOD FOR FRACTIONATION CONTROL

Gustav A. Kramer, Oakland, Calif., assignor to Shell Development Company, San Francisco, Calif., a corporation of Delaware Application August 18, 1931, Serial No. 557,751
Renewed May 7, 1935

5 Claims. (Cl. 202—40)

This invention relates to the operation of fractionating columns, and more specifically consists of the automatic control of a fractionating column to obtain a product of a predetermined purity and a definite constant composition.

Fractionating columns are designed for the separation by distillation of two or more mixed liquids. It is generally known that liquids which have widely different vapor pressures at the same temperature, and correspondingly different boiling points at the same pressure, are comparatively easy to separate by fractional distillation, but that the difficulty of such separation increases as the vapor pressures of the liquids approach each other. In every case, where a difference of boiling points under the prevailing pressure condition exists and where the liquids in question do not form azeotropic mixtures with each other, such separation by fractional distillation is possible, but it requires comparatively large equipment and great skill of operation when the boiling points of the liquids, at the pressure existing in the fractionating system, approach each other.

In the operation of fractionating columns of the conventional type, various methods of control are commonly used. For instance the column pressure may be kept constant, and the temperature of the vapors, leaving the top of the column, maintained in accordance with the boiling point of the desired product at the column pressure. This temperature is controlled within certain limits by varying the cooling at the top, either by varying the quantity of cooling water or by the regulation of the amount of reflux condensate.

Another method often employed consists in keeping the temperature of the vapors leaving leaving the top of the fractionator constant and varying the heat supplied at the bottom until the column pressure corresponds to the vapor pressure of the desired product at the top temperature.

Other methods are employed, usually combinations of the above mentioned, in which either pressure or temperature is permitted to vary, while steadiness and control of operation is achieved by various combinations of the amount of heat input, the degree of cooling and the rate of throughput, etc.

All of these conventional methods of control have the common defect, that they are sensitive only to changes in the existing conditions after they have already occurred at the top of the column, so that undesirable material is already contaminating the product of the column. It is obvious that a fractionating column controlled by the conventional methods does not insure production of a liquid having a definite constant composition.

When a fractionating column is functioning properly, there is a definite degree of separation between the components of the liquid and when equilibrium is reached, there is a definite difference in composition between the vapors leaving the top of the column and the liquid in the bottom of the column. This difference in composition is determined by the properties of the components of the liquid, the number of fractionating trays and their efficiency, and the operating conditions of the column. When a column of this type is in normal operation, there is a constant flow of vapors upward through the various fractionating stages and a constant downward flow of liquid with which the vapors continuously come in countercurrent contact. The composition of the vapors leaving the top plate is substantially the same as that of the product removed from the column. The liquid in its downward flow through the various fractionating stages interchanges its lighter components for heavier components from the ascending vapors. Thus, when equilibrium is reached, there is a composition gradient consisting of gradually increasing proportions of higher boiling components from the top to the bottom of the column and a corresponding gradient consisting of rising temperatures of the stages from top to bottom. As, at any constant column pressure, the temperature gradient is a function of the composition gradient, the temperature of any stage may be accepted as a correct indication of the composition, whenever the physical properties of the components are known.

My invention utilizes this temperature gradient as indicator of the composition and provides a method and apparatus which uses the temperature gradient as a means of control for the operation of a fractionating column.

In the accompanying drawings, wherein certain embodiments of the invention are shown by way of illustration, Fig. 1 discloses diagrammatically an installation comprising one complete unit.

Fig. 2 a cross section of a detail showing the control valve.

Fig. 3 discloses a diagram of an arrangement of the installation of a complete unit, in which the control valve is installed in the reflux line.

Figure 4:
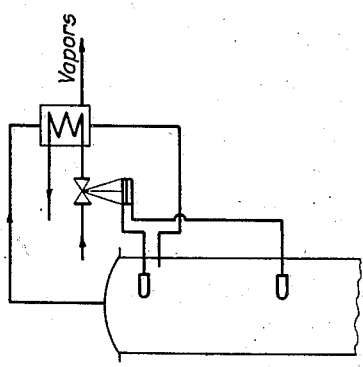

Fig. 4 shows an arrangement where the control valve is installed in the cooling line to the condenser, controlling the amount of cooling medium going to the condenser.

Figure 5:
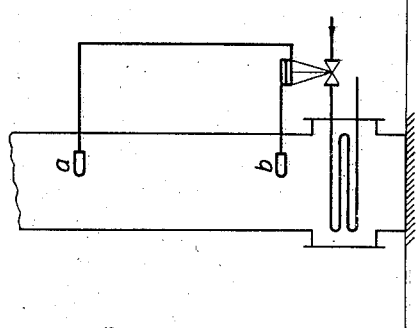

Fig. 5 discloses an arrangement where the control valve is installed in the heating element at the bottom of the tower.

Figure 6:
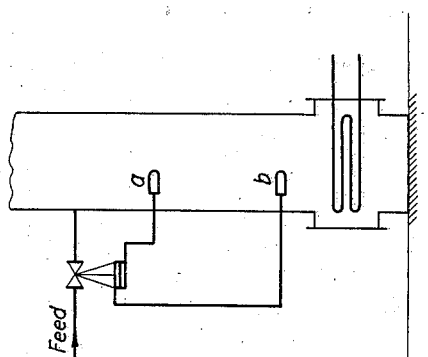

Fig. 6 shows an arrangement where the control valve is installed in the feed line to the column.

Referring to the drawings, Fig. 1 represents a fractionating column with an inlet pipe 2 having a heating coil 3 at the lower end and an outlet pipe 4 at the bottom. Column 1 contains a number of bubble trays 5 provided with suitable overflows 6 and has a vapor line 7 going over into condenser 8 provided with a cooling coil 9 and having a condensate outlet pipe 10 going over into a T 11, branching off into a reflux line 12 connected to fractionating column 1, the other branch being the product line 14 which goes over to a storage not shown and which is controlled by a control valve 13. The automatic control valve 13 is connected by means of a pipe 15 to a bulb 16 and by means of a pipe 17 to a bulb 18.

Fig. 2 shows a cross section of a control valve, by which our method of operation may be accomplished, and in which 13 is the body of the valve on which is mounted a yoke 19 carrying at the other end a diaphragm housing 20. The two chambers of the diaphragm housing 20 are closed off by diaphragm 21 on one side and diaphragm 22 on the other side. Frame 23 surrounding the diaphragm housing is connected by a bolt 24 to diaphragm 22 and by a bolt 25 to diaphragm 21 and carries the valve stem 26 which is provided with a spring 27. Pipe 15 connects one chamber of the diaphragm housing 20 to the bulb 16 not shown and pipe 17 connects the other chamber of the diaphragm housing 20 to a bulb 18 not shown.

Fig. 3 shows an installation of the control valve mounted in the reflux line.

With the apparatus described the method of operation is as follows:—

In Fig. 1 of the drawings 16 and 18 are bulbs filled with a liquid or liquids having desired vapor pressures at the required operating temperatures of the respective points of the fractionating column. Both temperatures are points of the temperature gradient of the column and are in agreement with the corresponding points of the composition gradient when the column is in equilibrium. The bulbs 16 and 18 are partially filled with a liquid leaving a small vapor space in the entire system as is customary in temperature indicating instruments of the pressure type. Bulbs 16 and 18 are connected by means of tubes 15 and 17 to the spaces between diaphragm housing 20, and diaphragms 22 and 21 respectively. These tubes and spaces are usually filled with the same liquid as bulb 16. An increase in temperature at bulb 16 results in an increase in pressure on the diaphragm 22, which in turn opens valve 26 by means of suitable leverage, increasing the flow of product and thereby decreasing the reflux. An increase in temperature of bulb 18 and consequent increase in vapor pressure increases the pressure on diaphragm 21 and moves the valve 26 towards its closed position, decreasing the product and increasing the reflux. The two forces established by the vapor pressures of bulbs 16 and 18 counteract each other and the resultant actuates upon a control valve adjusting the required amount of reflux, according to changes in the difference between the two temperatures.

The top product of the fractionating column has a definite boiling temperature under the pressure conditions maintained in the column, which temperature is also constantly assumed by bulb 16, resulting in a desired pressure on diaphragm 22. Bulb 18, being located at a point considerably lower than bulb 16, constantly assumes a temperature equal to the boiling temperature of the liquid in that particular section of the column in accordance with the prevailing pressure conditions. The temperature of bulb 18 is higher than that of bulb 16 and correspondingly exerts a higher pressure on diaphragm 21, provided the two liquids in the bulb are identical.

When the fractionating column is being adjusted to produce the desired product, a balanced condition between the pressure difference on the diaphragms 21 and 22 is established by regulating the pressure of spring 27, allowing the required amount of condensate from the reflux condenser to be returned to the column, while the remainder of the condensate is allowed to flow to storage as the desired product. It is an object of my invention to keep the amount of reflux exactly in accordance with the desired composition of the product. This is achieved by utilizing the change of the difference between the two temperatures of the temperature gradient as an indicator of an incipient change of the composition of the liquid in the column and adjusting the amount of reflux accordingly before this change in composition has reached the product of the column.

Assuming that the temperature of bulb 18 rises without a corresponding rise of temperature in the top of the column, it is clear that due to one of many possible reasons, some more higher boiling components of the liquid feed have found their way into a section of the column where they do not belong and that unless their upward diffusion is stopped, they will reach the top plate and thus contaminate the product. However, as soon as such a condition arises, the difference in temperature between bulb 16 and 18 increases due to the increase in temperature of the latter. This increase in temperature in turn increases the pressure in the bulb which causes the valve 13 to move towards its closed position, resulting in an increase in the amount of reflux to the column in accordance with the rise of temperature of bulb 18 and consequently in accordance with the incipient change in composition. The increase in reflux effects an increase of cooling in the column, which results in the correction of the equilibrium conditions of the column, by removing the increase of high boiling constituents from the ascending vapors. Should opposite conditions arise and the temperature of bulb 18 drop without a corresponding drop in temperature of bulb 16, the valve 13 would open to a greater extent and increase the amount of condensate flowing to storage and thus decrease the amount of reflux. This method of control results in a fractionating apparatus producing at all times from the liquid feed the maximum quantity of product having the desired composition, and maintaining automatically the desired operating condition.

It is also evident from the foregoing description that simultaneous and parallel changes in the temperature of bulbs 16 and 18 would not influence the adjustment of the column. Such a change may be brought about by a rise or drop of pressure within the system which would cause the boiling temperatures of all liquids present therein to rise or fall in approximately the same proportion. It might be mentioned that my method of control, in order to function with theoretical accuracy, should be responsive to variations in a certain established ratio of the absolute temperatures between bulbs 16 and 18 rather than to their difference. However, the absolute temperatures at which the columns operate are high in comparison to the temperature difference in question and the error incurred by the substitution of temperature difference for ratios is in most cases negligible. In case of necessity, this source of error can be eliminated by an arrangement of suitable levers between the temperature actuated diaphragms 21 and 22 on one hand and valve 13 on the other hand.

When the control valve is placed in the reflux line to the column as shown in Fig. 3 of the drawings, the connections from bulb 16 and 18 to the diaphragms 21 and 22 are reversed to obtain the proper control, by directly controlling the reflux and indirectly the product.

Fig. 5 is an arrangement of the installation of the automatic controlling device in which the object is to produce from the bottom of the tower a product with constant predetermined composition. In this case bulb "b" is inserted either in the vapors right above the liquid in the bottom of the column or in the liquid itself, while the valve controls the amount of heat supplied at the bottom of the column. Bulb "a" is inserted in the column at a point located above bulb "b".

Fig. 6 shows an arrangement in which the composition of the bottom product of the column is controlled by the amount of feed to the column. In this arrangement bulb "b" is inserted in the liquid or the vapors at the bottom of the column and bulb "a" at a point of the column above bulb "b", which may be above or below the entrance of the feed to the column.

It is understood that in the case of controlling the composition of the bottom product of the column, the control valve may be installed in the product line from the condenser as shown in Fig. 1, in the reflux line as shown in Fig. 2 or in the cooling line to the condenser as shown in Fig. 4.

Referring to Fig. 6 of the drawings, "a" and "b" are temperature bulbs inserted in the column at suitable points. Assuming that the temperature at bulb "a" decreases without a corresponding decrease of temperature at "b", it is clear that due to some reason, lower boiling point components have found their way into that section of the column where they do not belong and that unless their downward diffusion is stopped, they will reach the bottom of the tower and contaminate the product. Whenever such a condition arises, the difference in temperature between bulb "a" and "b" increases. The decrease in temperature in bulb "a", decreases the pressure, which reduces the pressure on the corresponding diaphragm and results in a movement of the valve towards its closed position, which decreases the amount of feed to the column. The decreased amount of feed will be raised to a higher temperature by the unchanged heat input thus correcting the equilibrium conditions of the column. The control of the feed to the column results in a maximum production according to the existing conditions and the capacity of the column.

It is to be understood that in the foregoing description of my invention and in the appended claims, the terms "fractionating system" and "fractionating column" are used to designate various fractionating means known in the art, the term "fractionating column" being limited, however, only to that part of the fractionating system, which may include a kettle containing a body of boiling liquid and a fractionating column proper in cooperation with the said kettle, but said term not embracing a partial or reflux condenser which may be used in combination with the fractionating column. The combination of the partial or reflux condenser with a fractionating column, such, for example, as shown in Figure 4, is termed for the purposes of this application a fractionating system.

While various embodiments of the invention have been described as examples, it is understood, that the operation is not limited to the particular temperature controlling device or instrument described, but that the operation may be accomplished by utilizing any equivalent apparatus known to those versed in the art.

It is also understood that the utilization of the temperature gradient to actuate the main control valve of the fractionating apparatus is not limited to the locations disclosed in the various figures of the drawings and that supplementary control devices such as used to control the heat input, the cooling effect, the quantity of feed or the pressure in the column may be added as required.

I claim as my invention:

1. A method of operating a fractionating system comprising: supplying the material to be fractionated to a column of the system, separating vapor components of said material from its liquid components within said column, separately withdrawing said vapor and liquid components from the column, substantially totally condensing the withdrawn vapors, returning a portion of the condensate to the column as a reflux, and controlling the flow of a fluid in and through the system in accordance with variations of a temperature gradient within the fractionating column.

2. A method of operating a fractionating column comprising: supplying the material to be fractionated to a column of the system, separating vapor components of said material from its liquid components within said column, separately withdrawing said vapor and liquid components from the column, substantially totally condensing the withdrawn vapors, returning a portion of the condensate to the column as a reflux, and controlling the amount of condensate to be refluxed to the column in accordance with the temperature difference between two points of the temperature gradient of the column.

3. A method of operating a fractionating column comprising: supplying the material to be fractionated to a column of the system, separating vapor components of said material from its liquid components within said column, separately withdrawing said vapor and liquid components from the column, substantially totally condensing the withdrawn vapors, returning a portion of the condensate to the column as a reflux, and controlling the amount of condensate to be refluxed to the column in accordance with the temperature gradient of the higher part of the column.

4. A method of operating a fractionating column comprising: supplying the material to be fractionated to a column of the system, separating vapor components of said material from its liquid components within said column, separately withdrawing said vapor and liquid components from the column, substantially totally condensing the withdrawn vapors, returning a portion of the condensate to the column as a reflux, and controlling the amount of heat supplied at the bottom of the column in accordance with the temperature difference between two points of the temperature gradient of the column.

5. A method of operating a fractionating column comprising: supplying the material to be fractionated to a column of the system, separating vapor components of said material from its liquid components within said column, separately withdrawing said vapor and liquid components from the column, substantially totally condensing the withdrawn vapors, returning a portion of the condensate to the column as a reflux, and controlling the amount of feed to the column in accordance with the temperature difference between two points of the temperature gradient of the column.

GUSTAV A. KRAMER.